INVENTORS:
Earl B. Muir
Walter F. Bosko
William E. Weseloh

ATTORNEYS

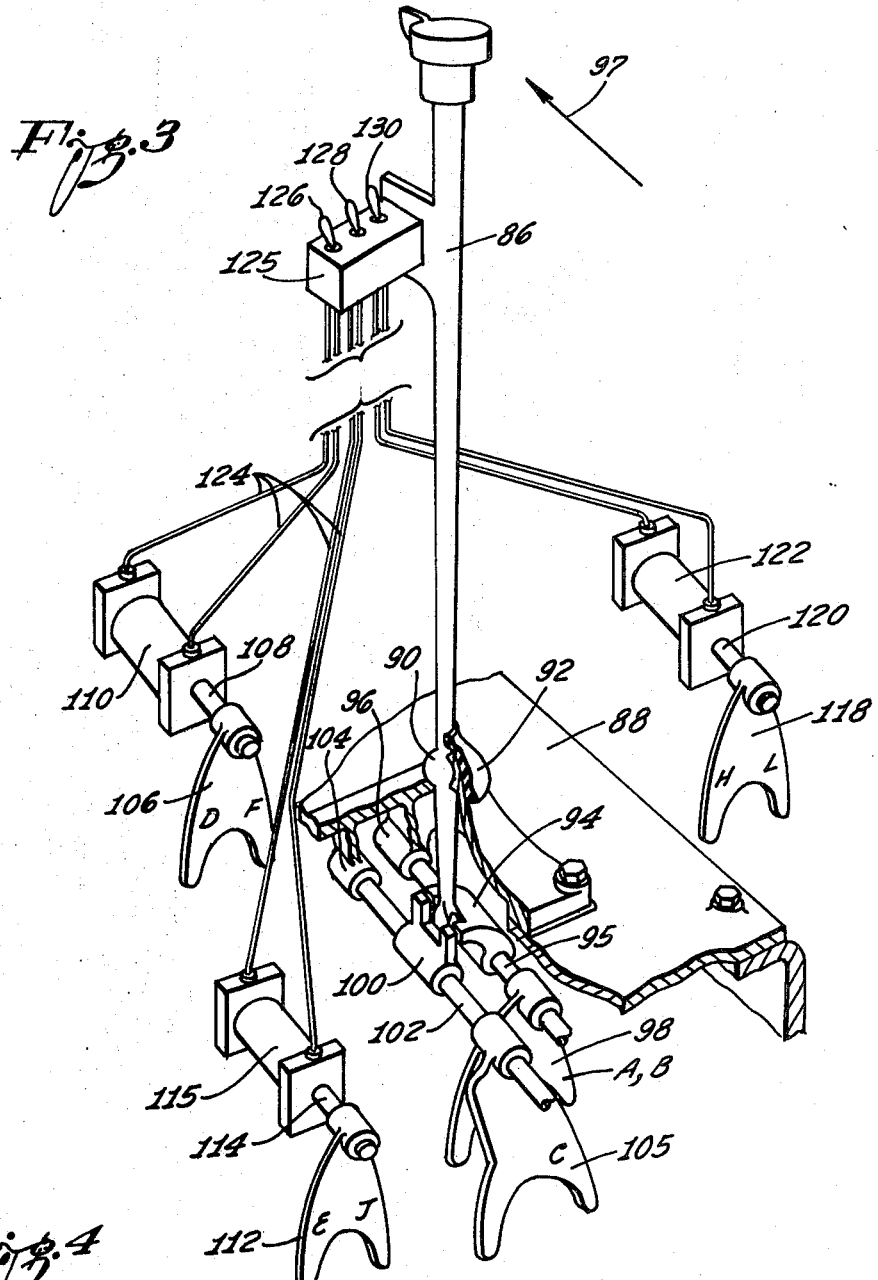
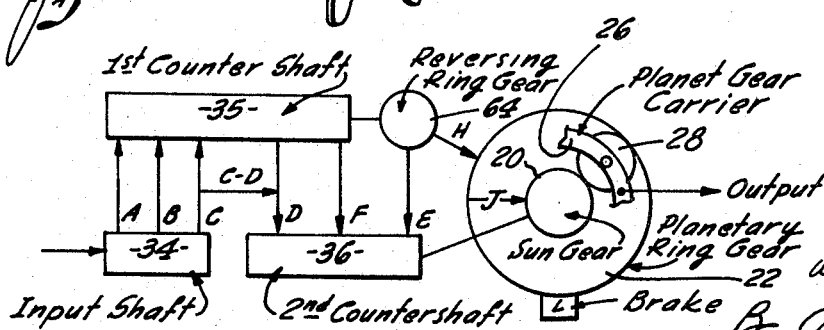

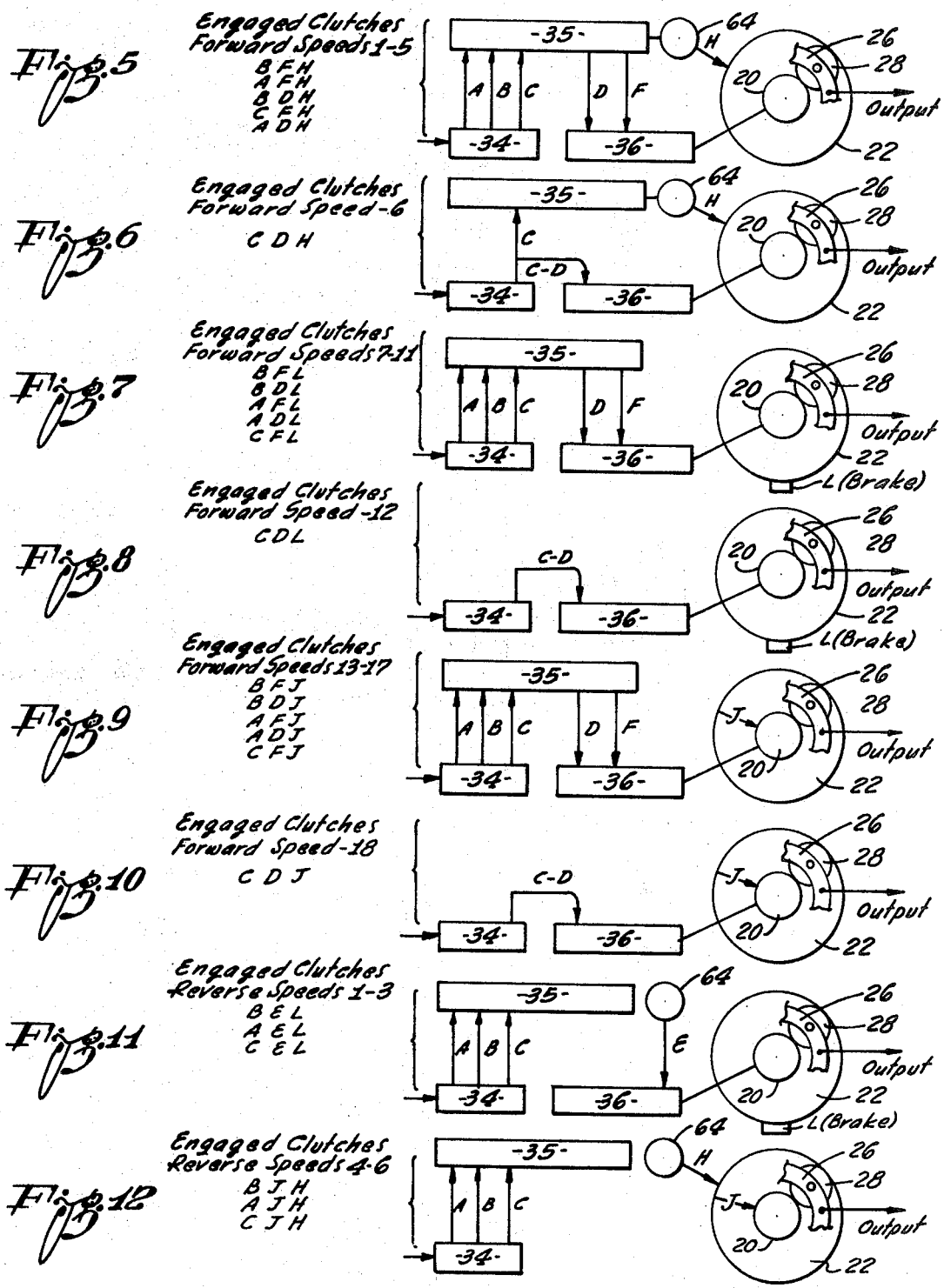

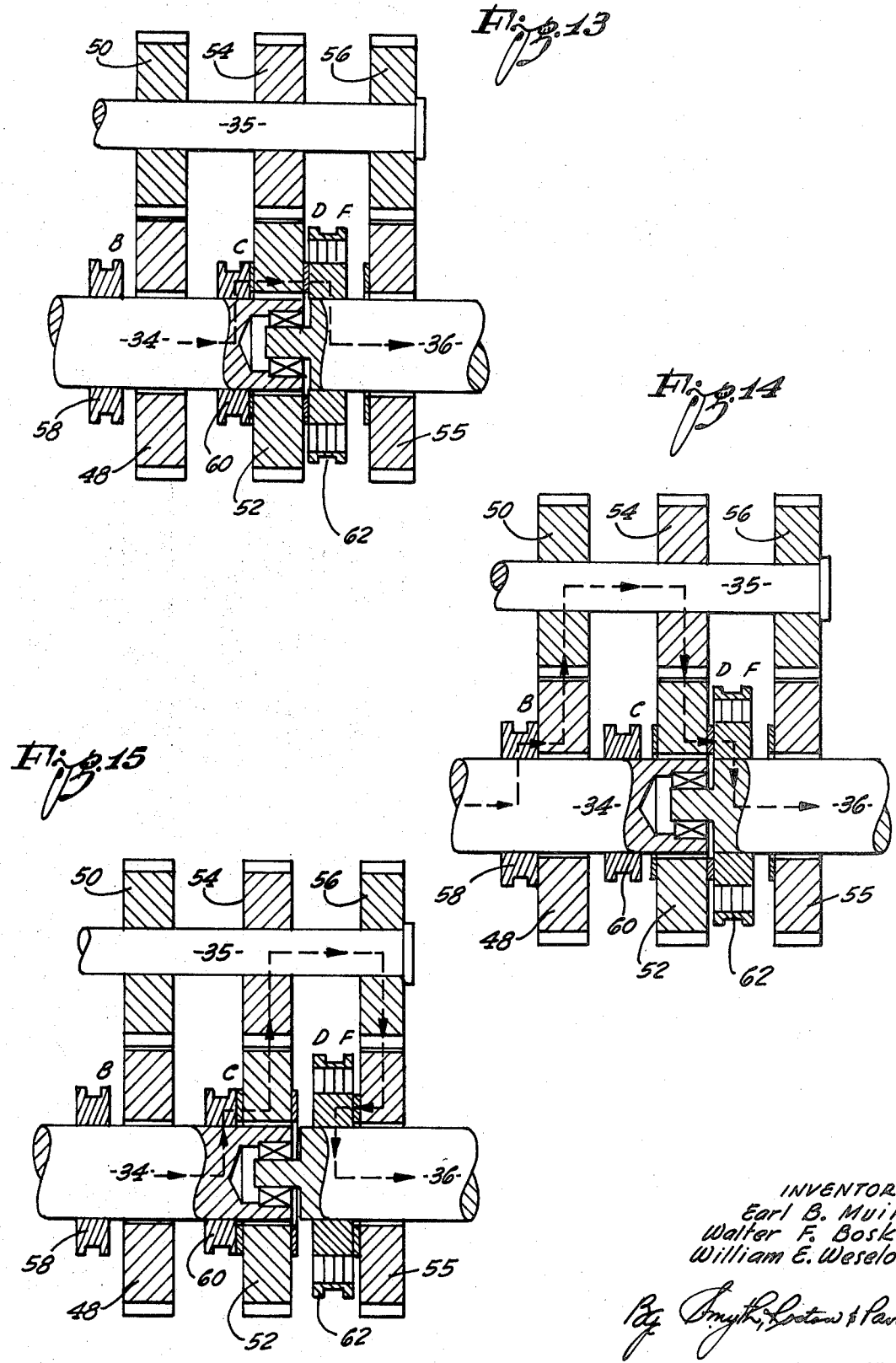

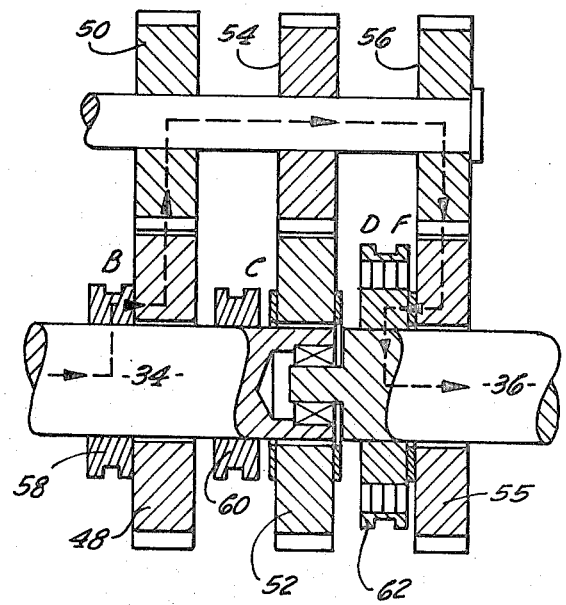
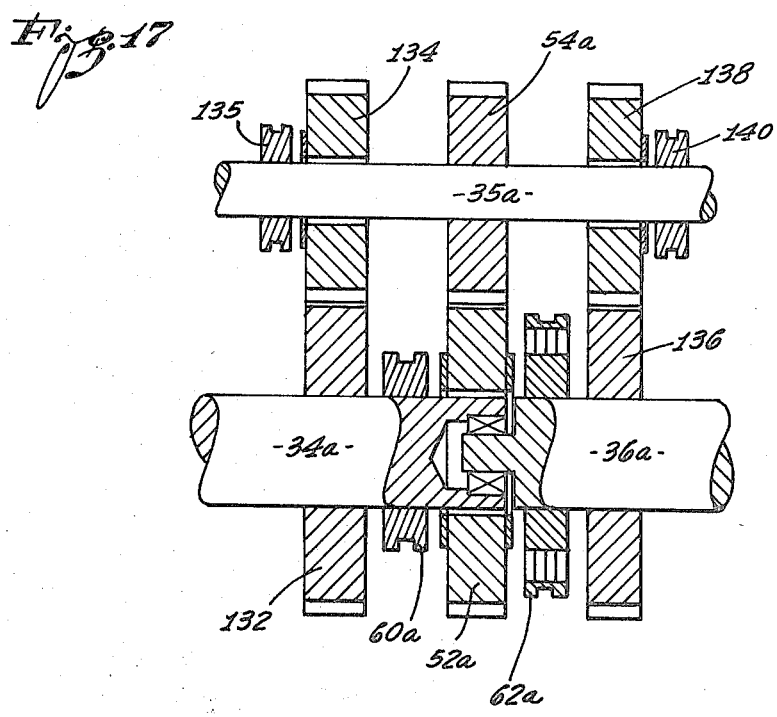

2

United States Patent Office 3,572,167
Patented Mar. 23, 1971

3,572,167
TRANSMISSION COMBINING GEARSET WITH PLANETARY GEARING
Walter F. Bosko, Garden Grove, Earl B. Muir, Palos Verdes Peninsula, and William E. Weseloh, Redondo Beach, Calif., assignors to White Motor Corporation
Filed Apr. 28, 1969, Ser. No. 819,722
Int. Cl. F16h 37/00
U.S. Cl. 74—740                                                27 Claims

ABSTRACT OF THE DISCLOSURE

The transmission incorporates a first countershaft means together with a second countershaft means and combines a 3-speed main gear box with a 2-speed splitter and with planetary gearing to provide eighteen ideally spaced forward speeds and six reverse speeds with some of the gears used for transferring power in opposite directions selectively.

BACKGROUND OF THE INVENTION

The copending Singer et al. patent application Ser. No. 708,254, filed Feb. 26, 1968, provides a transmission incorporating gear trains and clutches that may be employed in various combinations to provide multiple paths of power flow for different overall speed ratios in a graduated series of ratios with optimum spacing of the speed ratios. The number of available ratios exceeds the maximum number needed for any given vehicle. Thus the preferred embodiment of the Singer et al. transmission provides twenty-eight ratios of forward output speed relative to input speed and four ratios of reverse speed.

The Singer et al. disclosure teaches that such a multiple speed transmission assembly may be used with interchangeable shift control units, each control unit being constructed to actuate a selected number of the available ratios of output speed to input speed. In effect, the interchangeable control units are adapters for selective application to a basic transmission assembly with no need whatsoever to disturb the internal structure of the transmission assembly.

In addition to this advance in the art, the transmission of the copending Singer et al. application meets other long standing needs including: reduction in the cost of truck and tractor transmissions; reduction in the weight of truck and tractor transmissions; reduction in the number and sizes of gears required in a transmission of a given capability; and reduction in the loading per inch of gear teeth of truck and tractor transmissions.

Broadly described, the Singer et al. transmission comprises a compact selective gearset in combination with epicyclic gearing in the form of simple planetary gearing, the gearset providing multiple paths of power flow to the sun gear and ring gear respectively of the planetary gearing with the planet gear carrier connected to the output shaft of the transmission. The gear set has a first countershaft means in the form of three identical countershafts arranged symmetrically around a central input shaft and has a second countershaft means in the form of a quill or tubular shaft that is in axial alignment with the input shaft, the tubular shaft enclosing an inner coaxial shaft that is connected to the sun gear. Gears controlled by clutches provide multiple selective paths of power flow from the input shaft to the first countershaft means, multiple selective paths of power flow from the first countershaft means to hte second countershaft means and selective paths of power flow from the second countershaft means to the planetary gearing. The gearshift control of the Singer et al. transmission comprises a gear box, four power-actuated clutches, a first brake for the planetary ring gear and a second brake for the sun gear, the latter including a brake disk in the central region of the gearset.

The broad object of the present invention is to improve on the Singer et al. transmission in the directions of simplicity, efficiency, compactness and reduction in both weight and cost. It has been found that reducing the number of available ratios of input speed to forward output speed from twenty-eight ratios to eighteen ratios still provides a sufficient number of available ratios for a wide range of vehicles for use in different kinds of service. Thus with eighteen well spaced forward ratios, all of the ratios may be used if desired for an eighteen speed transmission or ratios may be selected for various versions, for example, a fifteen speed version, a thirteen speed version, a twelve speed version, a nine speed version, a six speed version, and a five speed version.

A specific object of the invention is to simplify the Singer et al. gearset by reducing the number of parts including the number of clutches and brakes. A further specific object is to simplify the steps for progressing from speed ratio to speed ratio, the overall progression being more direct with easily repeated patterns of clutch operation.

SUMMARY OF THE INVENTION

The simplifications of the Singer et al. transmission achieved by the present invention include: substitution of a single speed reversing idler ring gear for a set of three reversing idler pinions; substitution of a solid shaft for the quill shaft that serves as the second countershaft means; reorganization of the gearset to provide a 3-speed main gear box and a 2-speed splitter for cooperation with the planetary gearing; utilization of one set of gears for the dual function of transferring power either to or from the second countershaft means; elimination of one clutch by permanently connecting the second countershaft means to a component of the planetary gearing; and elimination of the brake disk in the central region of the gearset.

The overall result of these simplifications is a transmission having the following features and advantages:

The eighteen well spaced forward ratios cover the complete range from direct drive to a low gear ratio of 23.9:1 with the steps averaging 18% from direct drive down to 7.35:1 reduction and a maximum step of 39% between 7.35:1 and low gear. The low gear ratio of 23.9:1 is a 47% deeper ratio than afforded by any single commercially available transmission.

One basic transmission gear box can be tooled and manufactured for selected control systems ranging from a five speed transmission to an eighteen speed transmission without the necessity of any revisions of the basic transmission mechanism.

It is possible to produce a single basic transmission economically for use on all applications from 225 to 400 brake horsepower.

The use of highly reliable speed matching clutches in conjunction with the close step ratios results in an efficient mechanical transmission that is ideally suited for either semi automatic or fully automatic shifting.

The transmission requires only three power-actuated clutches instead of four as in the Singer et al. transmission and requires only one brake instead of two.

The transmission provides outstanding vehicle gradeability as a result of its low gear ratios when the transmission is employed with a 400 brake horsepower engine with an axle ratio giving a top speed of seventy miles per hour with a gross vehicle weight of 100,000 pounds. The gear ratios that are provided result in the ability of the transmission to start the vehicle with only 60% as much engine torque as required for transmissions that are presently commercially available. This advantage is important for turbocharged engines which have a relatively low starting torque capability.

The use of planetary gearing for final reduction makes it possible to design the low gear range of the transmission for 120 times the life of most available on-highway transmissions without increase in size, weight or inertia.

A single embodiment of the transmission is equally well suited for both on-highway applications and off-highway applications without the necessity of any power train modifications. The range of ratios of input speed to output speed eliminates the need for auxiliary transmissions and multiple speed axles.

The planetary gearset provides large step ratios without the usual result of redundant or overlapping ratios. The planetary gearing operates in three modes: a low range using the differential mode, an intermediate range using a reaction mode, and a high range using the locked planet mode.

The transmission provides the eighteen forward speed gear ratios in a package having the same number of gears, the same space and the same weight as a conventional eight to ten speed transmission.

The various features and advantages of the invention may be understood from the following detailed description and the accompanying drawings.

BRIEF DESCRIPTION OF THE DRAWINGS

In the drawings, which are to ge regarded as merely illustrative:

FIG. 3 is a perspective view, partly diagrammatic, indicating the construction of a suitable gear shift control for the transmission;

FIG. 4 is a diagram showing the various paths of power flow through the gearset and the planetary gearing;

FIGS. 5 to 12 are diagrams similar to FIG. 4 showing the paths of power flow that are employed for progressing through the eighteen forward speeds and the six reverse speeds of the transmission;

FIGS. 13 to 16 are sectional views illustrating a subcombination in the transmission shown in FIG. 1; and FIG. 17 is a similar view of a modification of the subcombination.

DESCRIPTION OF THE PREFERRED EMBODIMENT

Figure 1:
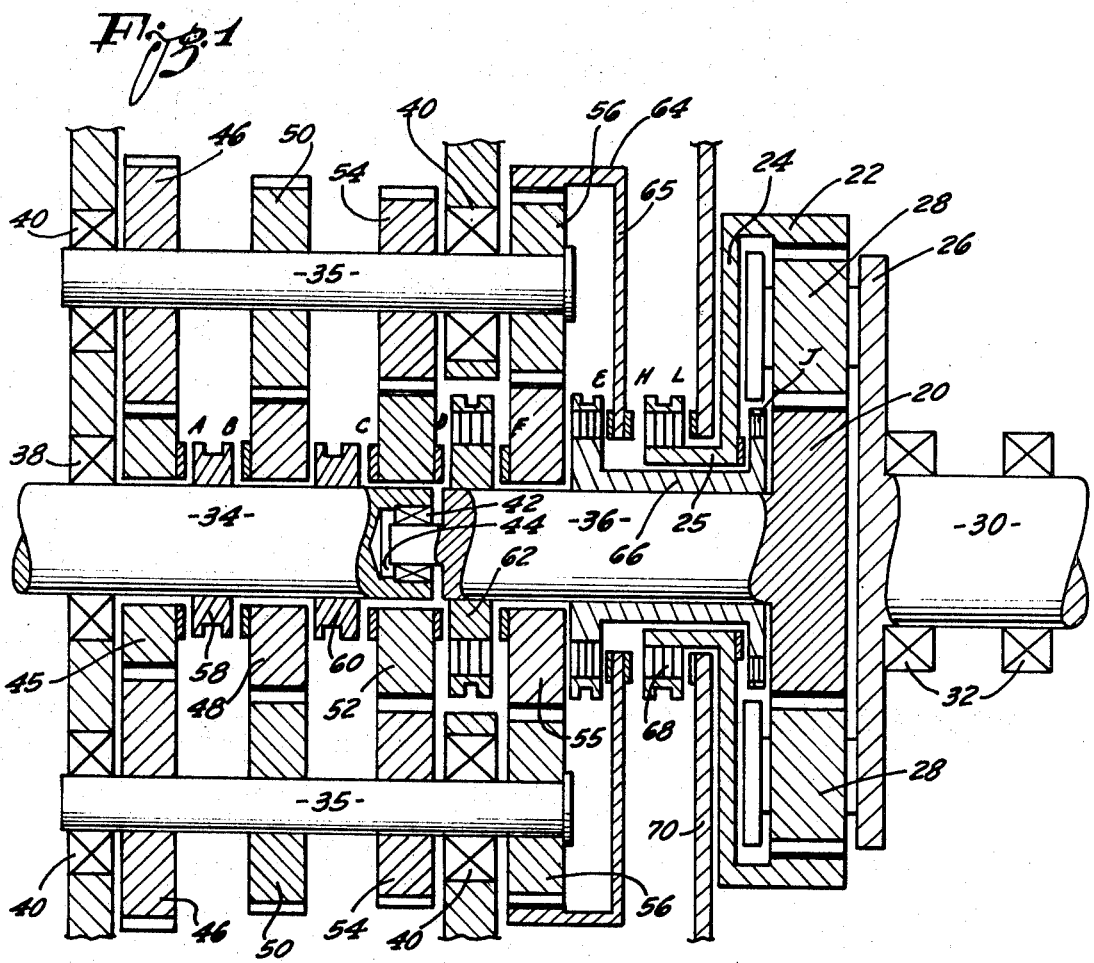
FIG. 1 is a view largely in section and partly in side elevation illustrating the presently preferred embodiment of the transmission.

In FIG. 1 which illustrates the presently preferred embodiment of the invention, a gearset drives planetary gearing which includes a sun gear 20, a planetary ring gear 22 having a radial wall 24 and a hub 25, and a rotary carrier 26 for a plurality of planet gears 28, the planet gear carrier being united with an output shaft 30 that is journalled in suitable bearings 32. The gearset includes: an input shaft 34; first countershaft means comprising at least two and preferably three countershafts 35 parallel to the input shaft and equally spaced around the input shaft; and second countershaft means in the form of a shaft 36 that is positioned in end-to end relation to the input shaft 34 and is unitary with the sun gear 20. The input shaft 34 is mounted in suitable bearings including a bearing 38; each of the first countershafts 35 is journalled in a pair of corresponding bearings 40; and the second countershaft 36 has an inner end of reduced diameter that is journalled in a bearing 42 in a cavity 44 in the end of the input shaft 34.

A first floating gear 45 on the input shaft 34 is in constant mesh with cooperating gears 46 that are keyed to the countershafts 35 respectively; a second floating gear 48 on the input shaft is in constant mesh with cooperating gears 50 that are fixed to the countershafts 35 respectively; a third floating gear 52 on the input shaft is in constant mesh with cooperating gears 54 that are fixed to the countershafts 35 respectively; and a fourth floating gear 55 on the second countershaft 36 is in constant mesh with cooperating gears 56 that are fixed to the countershafts 35 respectively. Each of the various pairs of gears 45 and 46, 48 and 50, 52 and 54, and 55 and 56 may be termed a gear train for power flow between two shafts of the gearset.

The four floating gears 45, 48, 52 and 55 are freely rotatable relative to the shafts on which they are mounted but may be releasably keyed to the shafts by slidable clutch collars. A first clutch collar 58 having a circumferential groove for engagement by a suitable shift fork provides two clutches which are designated A and B, clucth A being effective when the clutch collar is shifted leftward into engagement with the floating gear 45 and the clutch B being effective when the clutch collar is shifted to the right into engagement with the floating gear 48. A second clutch collar 60 having a circumferential groove for engagement by a shift fork provides a clutch designated C, the clutch C being engaged when the clutch collar is moved to the right into engagement with the floating gear 52.

A third clutch collar 62 which is mounted on the second countershaft 36 provides clutches D and F, clutch D being effective when the clutch collar is moved to the left into engagement with the floating gear 52 and the clutch F being effective when the clutch collar is moved to the right into engagement with the floaing gear 55. It is to be noted that since clutch C connects the floating gear 52 to the input shaft 34 and clutch D connects the same floating gear to the second countershaft 36, these two clutches may cooperate to interconnect the input shaft and the second countershaft. Thus the clutch C has a double function in that it may not only be employed for power flow from the input shaft to the first countershafts 35 but also may cooperate for the purpose of driving the second countershaft 36 directly by the input shaft 34.

A reversing idler ring gear 64 in mesh with the gears 56 on the first countershafts 35 respectively is coaxial with the planetary ring gear 22 and is formed with an inwardly extending radial web 65. For the purpose of releasably connecting the reversing idler ring gear 64 to the second countershaft 36 or alternately connecting the planetary ring gear 22 to the second countershaft, a clutch sleeve 66 that is slidingly keyed to the second countershaft 36 is provided with clutch means "E" to releasably engage the reversing idler ring gear 64 and is provided with clutch means "J" for releasable engagement with the planetary ring gear 22. The clutch sleeve 66 has a circumferential groove adjacent the clutch means "E" to receive a suitable shift fork for movement of the clutch sleeve from its normal neutral position to its two opposite effective positions selectively. It is to be noted that when clutch "J" is engaged to connect the planetary ring gear 22 to the second countershaft 36, the planetary gearing is locked to rotate as a unit since the second countershaft 36 is unitary with the sun gear 20.

Finally, a clutch collar 68 is slidingly keyed to the hub 25 of the planetary ring gear 22 and is provided with a circumferential groove for engagement by a suitable shift fork for movement of the clutch collar in opposite axial directions out of a normal neutral position. When the clutch collar 68 is moved to the left as viewed in FIG. 1 it functions as clutch "H" for engagement with the reversing idler ring gear 64 and when the clutch collar is shifted to the right it functions at clutch "L" for engagement with a fixed radial wall 70. Thus clutch "H" serves to connect the reversing idler ring gear 64 to the planetary ring gear 22 and clutch "L" serves as means to immobilize the planetary ring gear 22.

Figure 2:
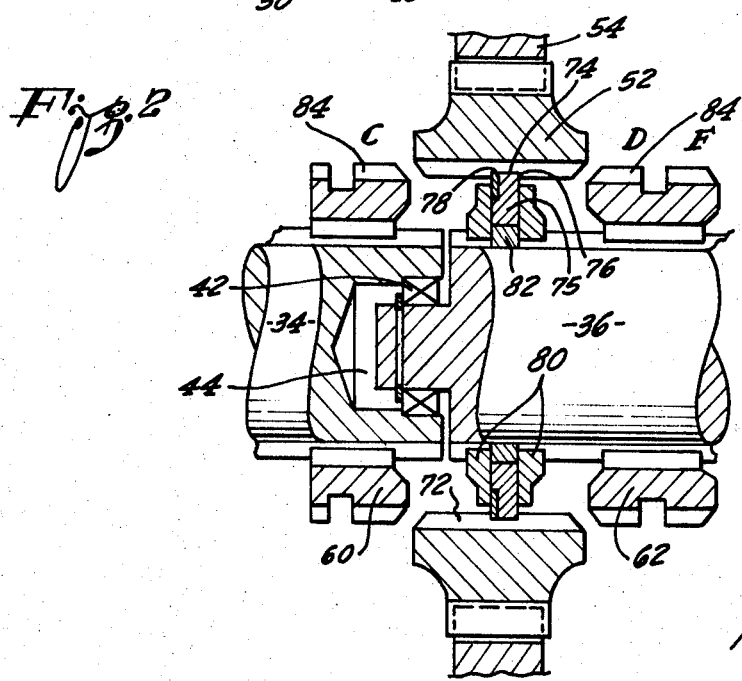
FIG. 2 is an enlarged fragmentary sectional view of a portion of the transmission showing how clutch collars on the input shaft and on the second countershaft are related to associated gears.

The manner in which the clutch collars 58, 60 and 62 are mounted on the input shaft 34 and on the second countershaft 36 for cooperation with the various floating gears 45, 48, 52 and 55 may be understood by reference to FIG. 2 which shows how the clutch collar 60 on the input shaft and the clutch collar 62 on the second countershaft cooperate with floating gear 52. Floating gear 52 which is in mesh with the gears 54 on the three countershafts 35 respectively is in the form of a ring gear with internal gear teeth 72 and is formed with an inner circumferential surface 74 to seat an inner circumferential retaining ring 75. In the construction shown, the retaining ring 75 abuts a shoulder 76 of the floating gear 52 and is secured by a suitable snap ring 78. The retaining ring 75 rotates between two retaining collars 80 in sliding contact therewith, the two retaining collars being spaced apart on the second countershaft 36 by a spacer ring 82. The two clutch colllars 60 and 62 are slidingly keyed to the input shaft 34 and to the second countershaft 36 respectively and are provided with outer circumferential teeth 84 for releasable engagement with internal teeth 72 of the floating gear 52.

By way of example, FIG. 3 shows a mechanism for controlling the various clutches, it being understood that various other types of control mechanisms may be employed within the basic concept of the invention. In FIG. 3, a manually operable shift lever 86 is mounted on the gear case 88 by a universal joint comprising a ball-shaped enlargement 90 of the lever and a complementary socket 92 of the gear case. To engage the clutch B, the shift lever 86 is swung leftward from its neutral position to cause the lower end of the shift lever to swing rightward into engagement with a yoke 94 on a rod 95 that is slidingly mounted in suitable sleeves including a sleeve 96. The shift lever 86 may then be swung rearwardly in the direction of the arrow 97 to cause forward movement of the slide rod 95 thereby to cause the shift fork 98 to move the clutch collar 58 in FIG. 1 to the right as viewed in FIG. 1 for engagement of clutch B. While the shift lever 86 is still inclined leftward as viewed in FIG. 3 the shift lever may be moved forward to cause corresponding movement of the clutch collar 58 in FIG. 1 to the left as viewed in FIG. 1 for engagement of clutch A.

If the shift lever 86 is swung to the right from its neutral position the lower end of the shift lever engages a yoke 100 on a second rod 102 that is slidingly mounted in suitable sleeves including a sleeve 104. The shift lever 86 may then be swung rearwardly to cause forward movement of the second slide rod 102 thereby to cause a shift fork 105 on the slide rod to move clutch collar 60 rightward as viewed in FIG. 1 to cause engagement of clutch C.

A shift fork 106 for movement of clutch collar 62 to engage clutches D and F selectively is mounted on a piston rod 108 of an air cylinder 110; a shift fork 112 for operating clutch sleeve 66 to engage clutches E and J selectively is mounted on a piston rod 114 of an air cylinder 115; and a shift fork 118 for operating clutch collar 68 to engage clutches H and L selectively is mounted on a piston rod 120 of an air cylinder 122. The various air cylinders 110, 115 and 122 are connected by air ducts 124 to corresponding four-way valves in a valve box 125 that is mounted on the shift lever 86. Valve handles 126, 128 and 130 on the valve box control the three air cylinders 110, 115 and 122 respectively, all three valve handles being normally in a neutral position.

The various gear ratios may be expressed by reciting the number of teeth on the different gears. The ratio between the floating gear 45 and the associated gears 46 is 39/41; the ratio between floating gear 48 and the associated gears 50 is 24/35; the ratio between the floating gear 52 and the associated gears 54 is 45/34; the ratio between the floating gear 55 and the associated gears 56 is 42/27; the ratio between the gears 56 and the reversing idler ring gear 64 is 27/96; the ratio between the sun gear 20 and the various planet gears 28 is 60/21; and the ratio between the various planet gears 28 and the planetary ring gear 22 is 21/102.

The selective paths of power flow through the transmission may be understood by referring to the diagram in FIG. 4 where the various clutches are represented by corresponding arrows. It is apparent that the following six paths are available for power flow from the input shaft 34 to the second countershaft 36 that is unitary with the sun gear 20: A, D; B, D; C, D; A, F; B, F; and C. F. Since the gear ratio represented by the arrow D differs from the gear ratio represented by the arrow F, the clutches D and F function as a two-speed splitter. The arrow C–D represents the power flow from the input shaft 34 to the second countershaft 36 when both clutches C and D are engaged. All of the power may be transferred from the input shaft 34 to the second countershaft 36 along the path C–D or power flow from the input shaft 34 may be divided between the path C–D to the second countershaft 36 and the path C to the first countershafts 35.

The following paths of power flow may be traced from the input shaft 34 to the planetary ring gear 22 through the reversing idler ring gear 64: A, H; B, H; and C, H. These three paths of power flow may be utilized to rotate the planetary ring gear 22 independently of the sun gear 20 or alternately with the planetary ring gear locked to the sun gear 20 by clutch J, the same three paths of power flow may be utilized for rotation of the planetary gearing as a unit.

The paths of power flow from the input shaft 34 to the second countershaft 36 through the reversing idler ring gear 64 may be traced as follows: A, E; B, E; and C, E. These three paths may be utilized to rotate the sun gear 20 and the ring gear 22 in a reverse direction.

TABLE I

| Speed | Clutches | Ground speed at 2,900 engine r.p.m. | Gear ratio in/out | Percent step |
|---|---|---|---|---|
| 18 | CDJ | 70.0 | 1.0000 | 17.5 |
| 17 | CFJ | 59.56 | 1.1753 | 18.4 |
| 16 | ADJ | 50.31 | 1.3914 | 17.5 |
| 15 | AFJ | 42.81 | 1.6353 | 18.0 |
| 14 | BDJ | 36.27 | 1.9301 | 17.5 |
| 13 | BFJ | 30.86 | 2.2685 | 19.0 |
| 12 | CDL | 25.93 | 2.7000 | 17.5 |
| 11 | CFL | 22.06 | 3.1733 | 18.4 |
| 10 | ADL | 18.63 | 3.7568 | 17.5 |
| 9 | AFL | 15.85 | 4.4154 | 18.0 |
| 8 | BDL | 13.43 | 5.2114 | 17.5 |
| 7 | BFL | 11.43 | 6.1250 | 20.0 |
| 6 | CDH | 9.52 | 7.3532 | 39.1 |
| 5 | ADH | 6.84 | 10.2312 | 21.0 |
| 4 | CFH | 5.65 | 12.3839 | 14.6 |
| 3 | BDH | 4.93 | 14.1927 | 21.4 |
| 2 | AFH | 4.06 | 17.2307 | 38.7 |
| 1 | BFH | 2.93 | 23.9023 | |
| R6 | CHJ | 26.06 | 2.6864 | |
| R5 | AHJ | 18.73 | 3.7380 | |
| R4 | BHJ | 13.50 | 5.1852 | |
| R3 | CEL | 9.65 | 7.2533 | |
| R2 | AEL | 6.24 | 10.0923 | |
| R1 | BEL | 5.00 | 14.000 | |

Table I shows how the various clutches may be engaged in sets of three to provide a progressive series of eighteen forward ratios of input speed to output speed and six ratios of reverse input speed to output speed. Table I also shows the percent step from one forward speed ratio to another. Table I further shows the different ground speeds in miles per hour on the assumption that the engine is operated at 2,900 r.p.m. and that the vehicle travels at the rate of 70 miles per hour at the gear ratio 1.0000.

FIGS. 5–12 are variations of the diagram in FIG. 4 to indicate the moving parts of the transmission that are active at the eighteen forward speeds and six reverse speeds. For clarity, the parts of the transmission that are not used for power flow are omitted from each of the diagrams. Thus in FIG. 5 clutches E, J and L are omitted because they are not utilized in the first five forward speeds; in FIG. 6 clutches A, B, F, E, J and L are omitted because the only power flow is split between path C from the input shaft 34 to the first countershafts 35 and path C–D from the input shaft to the second countershaft 36; in FIG. 7 idler ring gear 64 and clutches E, J and H are omitted; in FIG. 8 the first countershaft 35, the reversing idler ring gear 64 and clutches A, D, E, F, H and J are omitted because power flow from the input shaft is solely along path C–D; in FIG. 9 the reversing idler ring gear 64 and clutches E, H and L are omitted; in FIG. 10 the first countershaft 35, reversing idler ring gear 64 and clutches A, B, E, F, H and L are omitted because here again power flow from the input shaft is solely along path C–D; in FIG. 11 clutches D, F, H and J are omitted; and in FIG. 12 the second countershaft 36 and clutches E, F and L are omitted.

FIG. 5 shows how in the low speed range of the first five forward speeds the planetary gearing operates in a differential mode with the sun gear 20 driven in one rotary direction by the second countershaft 36 and with the planetary ring gear 22 driven in the opposite rotary direction by the first countershafts 35 in cooperation with the reversing idler ring gear 64. FIG. 7 shows how an intermediate range of forward speeds 7–11, inclusive, is carried out with the planetary gearing operating in the ring reaction mode, the planetary ring gear 22 being immobilized by the clutch L and the sun gear 20 being driven by the second countershaft 36; FIG. 9 shows how a third still higher range of forward speeds 13–17 is carried out with the planetary gearing operating in the locked planet mode, the planetary ring gear 22 being locked to the sun gear 20 by clutch J with the sun gear driven by the second countershaft 36.

FIG. 6 shows how forward speed 6 which lies between the lowest range of the five forward speeds and the intermediate range of five forward speeds may be carried out with the planetary gearing operating in the differential mode. The power flow from the input shaft 34 is divided between a path C–D to the sun gear 20 through the second countershaft 36 and a path C–H to the planetary ring gear 22 through the first countershaft 35 and the reversing ring gear 64.

FIG. 8 shows how forward speed 8 which lies between the intermediate range of five forward speeds and the higher range of five forward speeds may be carried out with the planetary gearing operating in the ring reaction mode. All of the power flow from the input shaft 34 is delivered to the sun gear 20 along the path C–D to the second countershaft 36 with the planetary ring gear 22 immobilized by clutch L.

FIG. 10 shows how the highest forward speed, namely forward speed 18, is carried out with the planetary gearing operating in the locked planet mode. All of the power from the input shaft 34 flows to the sun gear 20 along path C–D to the second countershaft 36.

FIG. 11 shows how the lower three of the six reverse speeds may be carried out with the planetary gearing operating in the ring reaction mode, the planetary ring gear 22 being immobilized by the clutch L and power flowing from the input shaft 34 to the sun gear 20 through the first countershaft 35, the ring gear 64 and the second countershaft 36.

FIG. 12 shows how the range of the three lower reverse ratios may be carried out with the planetary gearing operating in the locked planet mode. The power from the input shaft 34 flows to the planetary ring gear 22 through the first countershaft 35 and the reversing idler ring gear 64.

It is to be noted that in shifting progressively from speed to speed through the eighteen forward speeds, only one or two of a set of three clutches is changed and to shift from speed to speed in either of the two sets of three reverse speeds only one of a set of three clutches is changed. This feature simplifies gear shifts and simplifies automatic gear shifting if automatic gear shifting is desired.

TABLE II

| Ground speed at 2900 engine r.p.m. | Gear ratio in/out | 15 speed, percent step | 12 speed, percent step | 9 speed, percent step | 6 speed, percent step | 5 speed, percent step |
|---|---|---|---|---|---|---|
| 70.0 | 1.0000 | (15) | (12) | (9) | (6) | (5) |
|  |  | 17.5 | 17.5 |  |  | 17.5 |
| 59.56 | 1.1753 | (14) | (11) | 39.1 | 39.1 | (4) |
|  |  | 18.4 | 18.4 |  |  |  |
| 50.31 | 1.3914 | (13) | (10) | (8) | (5) |  |
|  |  | 17.5 | 17.5 |  |  | 64.2 |
| 42.81 | 1.6353 | (12) | (9) | 38.7 | 38.7 |  |
|  |  | 18.0 | 18.0 |  |  |  |
| 36.27 | 1.9301 | (11) | (8) | (7) | (4) | (3) |
|  |  | 17.5 | 17.5 |  |  |  |
| 30.86 | 2.2685 | (10) | (7) | 39.9 | 39.9 |  |
|  |  | 19.0 | 19.0 |  |  |  |
| 25.93 | 2.7000 | (9) | (6) | (6) | (3) | 94.6 |
|  |  | 17.5 | 17.5 |  |  |  |
| 22.06 | 3.1733 | (8) | (5) | 39.1 | 63.5 |  |
|  |  | 18.4 | 18.4 |  |  |  |
| 18.63 | 3.7568 | (7) | (4) | (5) | (2) |  |
|  |  | 17.5 |  |  |  |  |
| 15.85 | 4.4154 | (6) | 38.7 | 38.7 | (2) |  |
|  |  | 18.0 |  |  |  |  |
| 13.43 | 5.2114 | (5) | (3) | (4) |  | 95.7 |
|  |  | 17.5 |  | 41.1 | 66.5 |  |
| 11.43 | 6.1250 | (4) | 41.1 |  |  |  |
|  |  | 20.0 |  |  |  |  |
| 9.52 | 7.3532 | (3) | (2) | (3) | (1) | (1) |
|  |  | 39.2 | 39.2 |  |  |  |
| 6.84 | 10.2312 | (2) |  | (2) |  |  |
|  |  |  |  | 38.7 |  |  |
| 5.65 | 12.3839 |  | 134.3 |  |  |  |
|  |  | 68.4 |  |  |  |  |
| 4.93 | 14.1927 |  |  | (1) |  |  |
| 4.06 | 17.2307 | (1) | (1) |  |  |  |
| 2.93 | 23.9023 |  |  |  |  |  |

Table II shows by way of example how a fifteen speed transmission, a twelve speed transmission, a nine speed transmiion, a six speed transmiion and a five speed transmission may be provided by selecting various speed ratios among the available eighteen forward speeds. The selected forward speeds may be employed in combination with any of the reverse speeds. It will be readily appreciated that other versions of the fifteen speed transmission, the twelve speed transmission, the nine speed transmission, the six speed transmission and the five speed transmission are available. Table II shows the ground speeds at the various speed ratios and also shows the percentage steps for the gear shifts of the various transmissions.

All of the various transmissions indicated in Table II employ the same basic transmission mechanism, the various transmissions differing only in the control mechanisms for activating selected clutches in sets of three. It will be apparent to those skilled in the art that the shift control mechanism illustrated in FIG. 3 may be readily modified to control any of the various transmissions in Table II.

An important feature of the invention is that a subcombination of the described selective gear set may be used without the planetary gearing to serve as a versatile transmission with a minimum number of gears.

This useful subcombination, which is shown in FIGS. 13 to 16 inclusive, comprises the following elements: input shaft 34 which may be termed a drive shaft; shaft 36 which may be termed the driven shaft; at least one of the countershafts 35; floating gear 52 which may be termed a first floating gear; floating gear 48 which may be termed a second floating gear; floating gear 55 which may be termed a third floating gear; gear 54 on the countershaft 31 in mesh with the first floating gear 52; gear 50 on the countershaft 35 in mesh with the second floating gear 48; gear 56 on the countershaft 35 in mesh with the third floating gear 55; clutch collar 60 (clutch C) which may be termed a first clutch on the drive shaft 34 to engage the first floating gear 52; the left half of clutch collar 62 (clutch D) on the driven shaft 36 which may be termed a second clutch for releasably engaging the first floating gear 52; clutch collar 58 (clutch B) on the drive shaft 34 for releasable engagement with the second floating gear 48 and the right half of clutch collar 62 (clutch F) on the driven shaft 36 to releasably connect the driven shaft to the third floating gear 55.

In FIG. 13 the first clutch C and the second clutch D both engage the first floating gear 52 to provide a first path of power shown by dotted lines direct from the drive shaft to the driven shaft through the first floating gear 52.

In FIG. 14 clutch B on the drive shaft 34 engages the second floating gear 48 and the second clutch D engages the first floating gear 52 for a second path of power flow shown by dotted lines from the drive shaft to the driven shaft through gears 50 and 54 on the countershaft 35.

In FIG. 15 clutch C engages the first floating gear 52 and clutch F engages the third floating gear 55 for a third path of power flow shown by dotted lines from the drive shaft 34 to the driven shaft 36 through gears 54 and 56 on the drive shaft.

In FIG. 16 clutch B engages the second floating gear 48 and clutch F engages the third floating gear 55 for a fourth path of power flow shown by dotted lines from the drive shaft to the driven shaft through gears 50 and 56 on the countershaft 35.

From the foregoing it is apparent that the subcombination shown in FIGS. 13–16 may be regarded as providing three different normally ineffective gear trains. The first gear train indicated by a portion of the dotted lines in FIG. 14 is from the drive shaft 34 to the first floating gear 52 through the second floating gear 48 and gears 50 and 54 on the countershaft 35. The second gear train indicated by a portion of the dotted lines in FIG. 15 connects the first floating gear 52 to the third floating gear 55 through gears 54 and 56 on the countershaft 35. The third gear train indicated by a portion of the dotted lines in FIG. 16 transmits power from the drive shaft 34 to the driven shaft 36 and includes the second floating gear 48, gears 50 and 56 on countershaft 35 and the third floating gear 55. It is further apparent that the various clutches B, C, D and F constitute a plurality of clutch means that are selectively operable to make the three gear trans effective selectively.

Regarded in another light, the subcombination shown in FIGS. 13–16 includes at least one countershaft 35 and first, second and third gear means to connect the countershaft to the three floating gears, respectively, the three gear means being gears 50, 54 and 56 on the counter shaft.

The purpose of FIG. 17 is to indicate that in the described subcombination some of the floating gears and the corresponding clutch collars may be mounted on the countershaft 35.

In FIG. 17 one end of a drive shaft 34a confronts one end of a driven shaft 36a and a first floating gear 52a on the end of the drive shaft is engageable by an adjacent clutch collar 60a on the drive shaft and by an adjacent clutch collar 62a on the driven shaft 36a. A gear 54a keyed to a countershaft 35a is in mesh with the first floating gear 52a. A gear 132 fixed on the drive shaft 34a is in mesh with a second floating gear 134 on the countershaft 35a and the countershaft is provided with a clutch collar 135 for releasable engagement with the second floating gear. A gear 136 keyed to the driven shaft 36a is in mesh with a third floating gear 138 on the countershaft and the countershaft is provided with a clutch collar 140 for releasable engagement with the third floating gear. Thus clutch collar 60a has the function of the previously mentioned first clutch C; clutch collar 62a has the function of the previously mentioned second clutch D; clutch collar 135 on the countershaft 35a has the function of the previously described clutch B and clutch collar 140 on the countershaft has the function of the previously mentioned clutch F.

Our description in specific detail of the presently preferred embodiment of the invention will suggest various changes, substitutions and other departures from our disclosure. For example, it is obvious that the second countershaft 36 may be directly connected to the planetary ring gear 22 instead of being directly connected to the sun gear 20, suitable clutch means being provided to releasably connect the reversing idler ring gear 64 to the sun gear 20 instead of to the planetary ring gear 22.

We claim:

1. In a transmission of the character described, the combination of:
    a rotary input member;
    a rotary output member;
    epicyclic gearing including first, second and third interacting rotary components, the third component being connected to the output member;
    first countershaft means;
    second countershaft means constantly connected to one of said first and second components;
    a plurality of gear trains of different gear ratios for use selectively to connect the input member to the first countershaft means and to connect the first countershaft means to the second countershaft means;
    means to immobilize the other of said first and second components;
    a plurality of clutch means to activate said gear trains selectively;
    additaional clutch means to releasably connect said first countershaft means to said other of said first and second components; and
    means to operate said immobilizing means and the various clutch means selectively to drive said rotary output member at various speeds relative to said rotary input member.

2. A combination as set forth in claim 1 which includes clutch means to releasably connect said second countershaft means to said input shaft for rotation in unison therewith.

3. A combination as set forth in claim 2 in which said clutch means to releasably connect said second countershaft means to said input shaft includes:
    a floating gear of one of said gear trains, said floating gear being on one of said input shaft and said second countershaft means;
    a clutch collar slidingly keyed on said one of said input shaft and said second countershaft means to slide into engagement with the floating gear thereby to connect the floating gear to said one of said input shaft and said second countershaft means; and a second clutch collar slidingly keyed to the other of said input shaft and said second countershaft means to slide into engagement with the floating gear thereby to connect said other of said input shaft and said second countershaft means to said floating gear.

4. A combination as set forth in claim 2 which includes clutch means to activate at least one of said plurality of gear trains for actuation of the first countershaft means by the input shaft while the input shaft is connected to the second countershaft means, thereby dividing the power flow between the two countershaft means.

5. A combination as set forth in claim 1 which includes a reversing idler gear driven by said first countershaft means; and in which said additional clutch means releasably connects the reversing idler gear to said other of said first and second components.

6. A combination as set forth in claim 5 which includes clutch means to releasably connect the reversing idler gear to said second countershaft means.

7. A combination as set forth in claim 6 in which said last mentioned clutch means includes:

a clutch collar slidingly keyed to the second countershaft means and movable between a position to connect the reversing idler gear to the second countershaft means and a position to connect the second countershaft means to the other of said first and second components to lock the epicyclic gearing for rotation as a unit.

8. A combination as set forth in claim 5 in which said first component is a planetary sun gear, said second component is a planetary ring gear, and said third component is a planet gear carrier;

in which said reversing idler gear is a ring gear coaxially of the planetary ring gear; and in which said additional clutch means releasably connects the reversing idler gear to the planetary ring gear.

9. A combination as set forth in claim 8 in which said reversing idler ring gear is in mesh with a gear of one of said gear trains.

10. A combination as set forth in claim 8 in which said additional clutch means includes a clutch collar slidable between a first position to interconnect the two ring gears and a second position in engagement both with the planetary ring gear and with fixed structure to immobilize the planetary ring gear.

11. In a transmission of the character described, the combination of:

epicyclic gearing including first, second and third interacting rotary components, the third component being the output member of the transmission;

an input shaft;

a first countershaft means;

a second countershaft means, said second countershaft means being a shaft coaxial with the input shaft in end-to-end relation thereto and being constantly connected to said first component of the epicyclic gearing, said first countershaft means comprising at least one shaft parallel with the confronting end portions of the input shaft and the coaxial shaft;

a plurality of gear trains for power flow from the input shaft to said first countershaft means and from said first countershaft means to said second countershaft means;

clutch means on said input shaft and on said second countershaft means respectively to activate said gear trains selectively; and means to releasably connect said first countershaft means to said second component of the epicyclic gearing, said releasable connecting means including a reversing idler gear connected to one of said first countershaft means and said second component and clutch means to releasably connect the reversing idler gear to the other of said first countershaft means and said second component.

12. A combination as set forth in claim 11 which includes clutch means to releasably connect the first countershaft means to the second countershaft means through said reversing idler gear.

13. A combination as set forth in claim 12 in which said reversing idler gear is an idler ring gear in mesh with one of said gear trains.

14. A combination as set forth in claim 11 which includes clutch means to interconnect the confronting ends of the input shaft and the second countershaft means respectively for rotation of the second countershaft means in unison with the input shaft.

15. A combination as set forth in claim 11 which includes means to releasably interconnect said first and second components of the epicyclic gearing.

16. A combination as set forth in claim 15 which includes clutch means to releasably connect the first countershaft means to the second countershaft means through said reversing idler gear; and which includes clutch means to interconnect the confronting ends of the input shaft and the second countershaft means for rotation of the second countershaft means in unison with the input shaft.

17. In a transmission of the character described the combination of:

epicyclic gearing including first, second and third interacting rotary components, the third component being the output member of the transmission;

an input shaft;

a shaft coaxial with the input shaft in end-to-end relation thereto, said coaxial shaft being constantly connected to said first component;

countershafts parallel with the confronting ends of the input and the coaxial shaft;

a plurality of floating gears distributed along the input shaft and the coaxial shaft;

a corresponding plurality of gears on each of the countershafts in mesh with the floating gears respectively;

a corresponding plurality of clutch means distributed along the input shaft and the coaxial shaft to connect the input shaft and the coaxial shaft selectively to the respective floating gears for power flow from the input shaft to the countershafts and power flow from the countershafts to the coaxial shaft;

a reversing idler ring gear surrounding the countershafts in mesh with gears on the countershafts respectively that are in mesh with a floating gear on the coaxial shaft; and clutch means to connect said reversing idler ring gear with said second component of the epicyclic gearing.

18. A combination as set forth in claim 17 which includes means to releasably connect said idler ring gear to said coaxial shaft.

19. A combination as set forth in claim 17 which includes means to releasably interconnect said first and second components for rotation of the epicyclic gearing as a unit.

20. A combination as set forth in claim 17 which includes means to interconnect the confronting ends of the input shaft and the coaxial shaft for rotation of the coaxial shaft in unison with the input shaft.

21. A combination as set forth in claim 20 which includes means to releasably connect said reversing idler ring gear to said coaxial shaft; and which includes means to releasably interconnect said first and second components for rotation of the epicyclic gearing as a unit.

22. In a transmission of the character described, the combination of:
  epicyclic gearing including first, second and third interacting rotary components, the third component being the output member of the transmission;
  releasably means to immobilize said second component;
  first countershaft means;
  second countershaft means constantly connected to said first component;
  a first plurality of gear trains for power flow from the input shaft to the first countershaft means;
  a second plurality of gear trains for power flow from the first countershaft means to the second countershaft means;
  a first plurality of clutch means to activate the first plurality of gear trains respectively;
  a second plurality of clutch means to activate the second plurality of gear trains selectively;
  reversing idler gear means;
  first clutch means to connect the first countershaft means to the second component of the epicyclic gearing through said reversing idler gear means;
  second clutch means to interconnect said first and second components of the epicyclic gearing for rotation of the epicyclic gearing as a unit,
  whereby with said first clutch means engaged, said two pluralities of clutch means may be engaged selectively for a first range of relatively high gear ratios between the input shaft and the third component with the epicyclic gearing functioning in differential mode,
  whereby with said second component immobilized by said releasable means, said two pluralities of clutch means may be engaged selectively for a second range of lower gear ratios between the input shaft and the third component with the third component of the epicyclic gearing functioning as a reaction component,
  whereby with said second clutch means engaged, said two pluralities of clutch means may be engaged selectively for a third range of still lower gear ratios between the input shaft and the third component with the epicyclic gearing locked to rotate as a unit, and
  whereby with said first and second clutches engaged, said first plurality of clutches may be engaged selectively for a range of reverse gear ratios between the input shaft and the third component with the epicyclic gearing locked for rotation in unison.

23. A combination as set forth in claim 22 which includes a third clutch means to connect the first countershaft means to the second countershaft means through said reversing idler gear,
  whereby with said second component immobilized by said releasable means and said third clutch means engaged, said first plurality of clutch means may be engaged selectively for another range of reverse gear ratios with the third component of the epicyclic gearing functioning as the reaction component.

24. A combination as set forth in claim 22 which includes releasable means to interconnect said input shaft and second countershaft means whereby with said interconnecting means and said first clutch means engaged, a clutch means of said first plurality of clutch means may be engaged for power flow from the input shaft to the second component of the epicyclic gearing through the first countershaft means and the reversing idler gear means and for simultaneous power flow from the input shaft to the first component of the epicyclic gearing through said second countershaft means for a gear ratio between said first and second ranges of gear ratios.

25. A combination as set forth in claim 1 in which the input member and the second countershaft means are positioned coaxially with confronting ends adjacent each other;
  which includes a floating gear on the confronting end of one of said input member and said second countershaft means adjacent the confronting end of the other of said input member and second countershaft means;
  in which a first clutch releasably connects the input member to said floating gear;
  in which a second clutch releasably connects the ground countershaft means to said floating gear;
  in which said plurality of gear trains include a first normally ineffective gear train for transmitting power from the input member to said floating gear independently of the first clutch;
  in which said plurality of gear trains includes a second normally ineffective gear train for transmitting power from the floating gear to the second countershaft means independently of the second clutch;
  in which the plurality of gear trains includes a third normally ineffective gear train for transmitting power from the input member to the second countershaft means independently of said floating gear,
  whereby said first and second clutches may be engaged for a first path of power flow from the input member directly to the second countershaft means through the floating gear, or with the first gear train effective, the second clutch may be engaged for a second path of power flow from the input member to the second countershaft means through the first gear train and the floating gear,
  or with the second gear train effective, the first clutch may be engaged for a third path of power flow from the input member to the second countershaft means through the second gear train and the floating gear,
  or selected clutch means of said plurality of clutch means may be engaged for a fourth path of power flow from the input member to the second countershaft means through the third gear train independently of the floating gear.

26. A combination as set forth in claim 25 in which the first countershaft means is common to said first, second and third gear trains;
  in which a second floating gear is on the input member;
  in which a third floating gear is on the second countershaft means;
  in which three gears fixedly mounted on the first countershaft means are in mesh with the three floating gears respectively;
  in which a clutch means of said plurality of clutch means to make the first gear train effective is a clutch collar slidingly keyed to the input member for engagement with the second floating gear; and
  in which a clutch means of said plurality of clutch means that makes the second gear train effective is a clutch collar slidingly keyed to the second countershaft means for engagement with the third floating gear.

27. A combination as set forth in claim 3 which includes a clutch collar slidingly keyed to one of said input member and second countershaft means movable in one axial direction to engage the first floating gear and movable in the opposite axial direction to engage one of said second and third floating gears.

References Cited
UNITED STATES PATENTS

| | | | |
|---|---|---|---|
| 1,935,018 | 11/1933 | Chambers | 74—740 |
| 2,985,036 | 5/1961 | Förster | 74—740 |
| 3,357,276 | 12/1967 | Vavulo et al. | 74—740 |

CORNELIUS H. HUSAR, Primary Examiner